Figure 1:
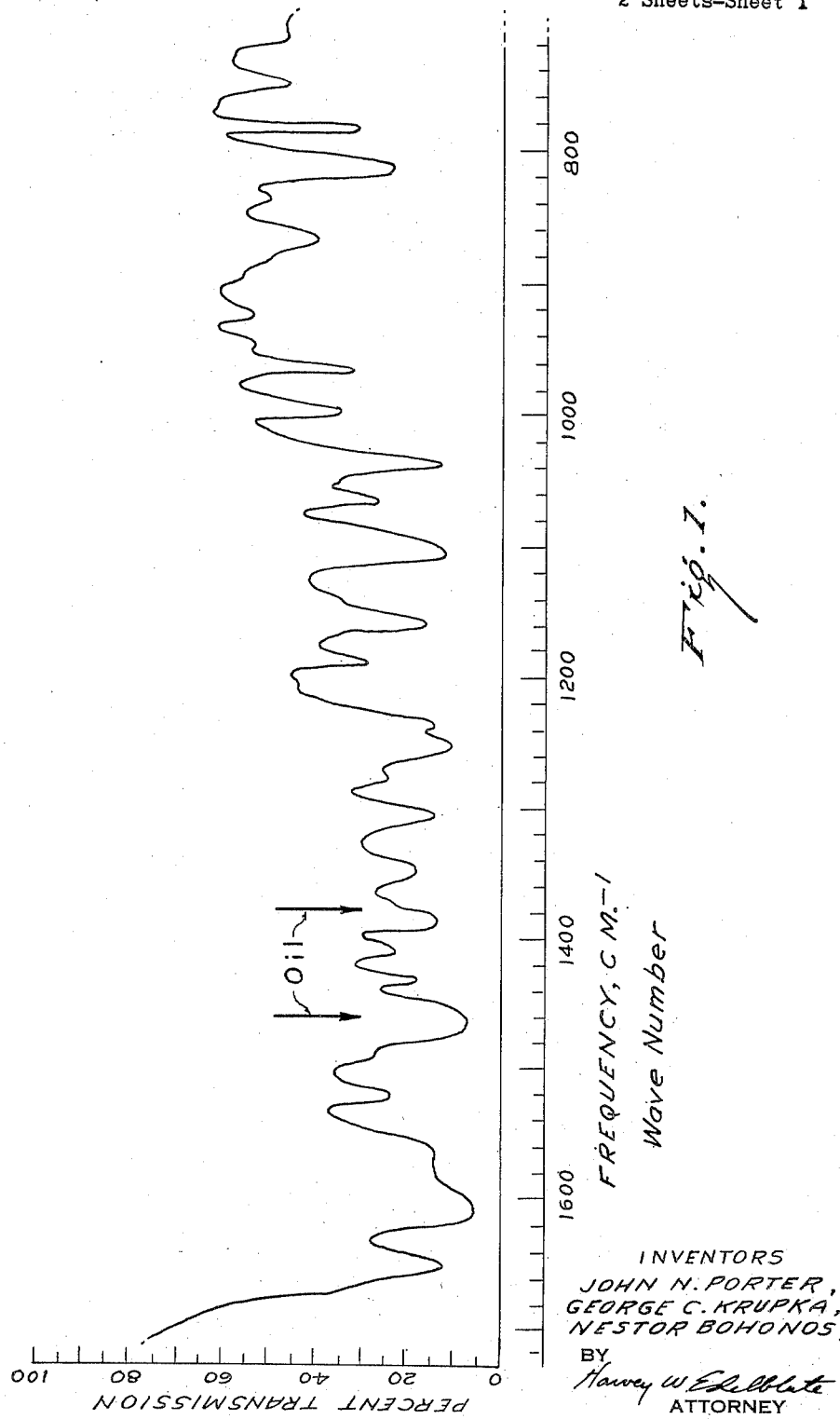

Sept. 18, 1956 J. N. PORTER ET AL 2,763,642
PUROMYCIN AND PREPARATION OF SAME
Filed Nov. 1, 1951 2 Sheets-Sheet 1

INVENTORS
JOHN N. PORTER,
GEORGE C. KRUPKA,
NESTOR BOHONOS,
BY
ATTORNEY

Sept. 18, 1956 J. N. PORTER ET AL 2,763,642
PUROMYCIN AND PREPARATION OF SAME
Filed Nov. 1, 1951 2 Sheets-Sheet 2

INVENTORS
JOHN N. PORTER,
GEORGE C. KRUPKA,
NESTOR BOHONOS,
BY
ATTORNEY

2,763,642

Patented Sept. 18, 1956

2,763,642

PUROMYCIN AND PREPARATION OF SAME

John Norman Porter, Glen Rock, N. J., and George Charles Krupka and Nestor Bohonos, Nanuet, N. Y., assignors to American Cyanamid Company, New York, N. Y., a corporation of Maine Application November 1, 1951, Serial No. 254,354

6 Claims. (Cl. 260—211.5)

This invention relates to new substances having antimicrobial properties and to processes of producing the same. The invention includes a new anti-microbial product, its several salts, preparations containing the same and a fermentation process by which the new products may be produced.

Substances having anti-bacterial and anti-Rickettsial activity have been produced by fermentation processes by the action of several species of microorganisms. Many of these antibiotics have been found to be useful against a variety of the pathogenic bacteria. However, there remain many pathogens that are resistant to the presently available antibiotics. Among pathogenic microorganisms which appear to be unaffected by most of the commonly known antibiotics include the protozoa. Microorganisms of this class include pathogenic protozoa which cause serious diseases, including trypanosomiasis caused by several species of the genus Trypanosoma.

We have discovered that an apparently heretofore undescribed microorganism of the Streptomyces genus will produce, under suitable conditions, which will be described hereinafter, a substance which is effective against certain protozoa such as those of the genus Trypanosoma, as well as various pathogenic Gram positive and Gram negative bacteria. The new product that is produced by the fermentation process about to be described shows activity against microorganisms such as *Staphylococcus albus*, *Staphylococcus aureus*, *Sarcina lutea*, *Klebsiella pneumoniae*, *Proteus vulgaris*, *Escherichia coli*, *Bacillus cereus*, *Bacillus subtilis*, *Salmonella pullorum*, *Eberthella typhosa*, and still others. Also, as just stated, the product of the fermentation process is active against certain protozoa including *Trypanosoma equiperdum*, *T. cruzi*, *Tetrahymena geleii*, and others.

The antibiotic produced by the new species of Streptomyces is now known as puromycin. The structure of puromycin has been elucidated as 6-dimethylamino-9-[3 - (p - methoxy - L - β - phenylalanylamino) - 3 - deoxy-β-D-ribofuranosyl]purine [Waller et al., J. A. C. S. 75, 2025 (1953)], and has the following structural formula:

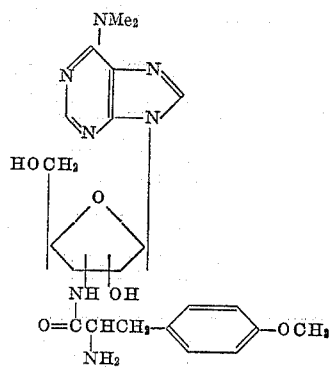

The name *Streptomyces albo-niger* is proposed for the new species because of the production of white spores together with olivaceous black pigment on media such as asparagine-dextrose agar and starch agar.

Viable cultures of two strains of *S. albo-niger* originally designated by us as P638 and P638–47 have been deposited with the American Type Culture Collection, Washington, D. C. and have been given their accession numbers ATCC No. 12,461 and ATCC No. 12,462.

The principal distinguishing characteristics of *S. albo-niger* from other species of Streptomyces include the formation of an olivaceous black soluble pigment on certain media as will be shown in the following table. The organism produces no pigment on gelatin and certain other organic media as will also appear. White spores are scantily produced. The growth pattern progressively varies with age from moist colorless colonies to yellow moist colonies to black moist colonies to a black substrate mycelium with white aerial mycelium. The organism grows well on a synthetic medium containing mannitol as the sole source of carbon. There appears to be a complete lack of any spiral formation in the aerial mycelium under most conditions. Colorless droplets are produced on the surface of the aerial mycelium. Optimum growth is within the range 28–32° C. Other morphological physiological characteristics of *S. albo-niger* are shown in the following table:

| Medium | Amount of Growth | Aerial mycelium color and zone color | Soluble Pigment | Remarks |
| --- | --- | --- | --- | --- |
| Asparagine-dextrose agar | good | sporulation poor, growth white. | black | colonies at 48 hours yellow with no pigment present. Pigment begins to appear at 8 days. |
| Acid asparagine-dextrose agar | poor | none | none | colonies moist colorless. |
| Gelatin | fair | white aerial mycelium | light yellow | liquefaction slight to good. |
| Starch agar | good | white to pale olive buff or cartridge buff (Ridgway). | black | zones of hydrolysis 4-5 mm. in 14 days; clear, colorless droplets; sweet penetrating odor. |
| Emerson's agar | do | white/appears at 2 weeks | none | reverse yellow to tan. |
| Synthetic agar | poor | white | none at 12 days | reverse white. |
| Potato plugs | excellent | white aerial mycelium abundant. | dark, greenish black typically. | colonies moist and yellow, later becoming white with aerial mycelium-colorless droplets. |
| Calcium malate plates | good | white | none, except at 1 month. | reverse grayish white. |
| Nutrient agar | poor | none | none | colonies moist, smooth, and then of the color of the media. |
| Glucose agar | do | do | do | Do. |
| Litmus milk | poor—no pellicle or rings | white | clearing of milk in upper portion of liquid. | growth rings white above, then yellow green to light yellow and white below. |
| Krainsky dextrose agar | fair to good | sl. white aerial mycelium | blackish gray | reverse blackish gray. |
| Potato dextrose sugar | good to excellent | abundant white aerial mycelium. | at 1 month a light brown pigment was seen. | reverse light brown-colorless droplets on colony surface. |
| Bennett's agar | good | white to light gray | blackish brown | reverse dark brown. |
| Cellulose | none | | | |
| Carrot plugs | excellent | white | none | |
| Corn steep liquor | good | sl. white aerial | black | heavy mycelial growth but sporulation poor. |
| Sabaroud's maltose agar | excellent | white | do | aerial mycelium formed at about 2 weeks. |
| Nutrient agar (Waksman) | poor | only occasionally forming white aerial mycelium. | none | reverse yellow. |
| Glucose agar (Waksman) | good | no sporulation | do | reverse yellow, surface wrinkled, raised, and yellow-colored. |
| Starch agar (Waksman) | yellow growth | usually no aerial mycelium | do | reverse yellow. |
| Asparagine dextrose (Waksman) | good | white | none to slight darkening. | Do. |

It will be understood that strain variants within the species may not exhibit all of the exact characteristics set forth above yet under proper fermentation conditions will produce the anti-microbial substance of the present invention and these strains may be regarded as being of the species S. albo-niger as described and claimed herein.

To produce puromycin, a culture of the just described mold is grown aerobically, preferably in deep tank culture, in a suitable nutrient medium under conditions of time, temperature, pH etc. as will be hereinafter described. The nutrient medium contains, in common with media in which other fungi are grown for the production of antibiotic substances, a source of carbon such as a carbohydrate; a source of nitrogen, organic or inorganic; certain mineral salts such as phosphates, and small amounts of various cations and anions which are usually found as impurities in other substituents of the medium.

As a carbon source, there may be used ordinary starch, the so-called soluble starches and dextrins, and sugars such as sucrose, glucose, maltose, xylose, lactose or the like and other water soluble or partially water soluble carbohydrate substances such as the sugar alcohols, mannitol, etc. The amount of such carbon sources for best antibiotic production in the medium may vary considerably, from about ½% to 5% by weight of the total weight of the fermentation medium.

Suitable sources of nitrogen for the fermentation process include a wide variety of substances such as the amino acids, casein, both hydrolyzed and unhydrolyzed, peptones and peptides, fish meal, soy bean meal, meat extracts, liver cake, and various other nitrogenous substances of vegetable or animal origin. Chemicals such as urea, nitrates, and ammonium compounds may also be added to the nutrient media as a source of nitrogen. Chemical precursors may be added as a source of particular preformed groups of the molecule whereby higher yields of the product are obtained. Corn steep liquor, because of the wide variety of substances contained herein, both organic and inorganic, has been found to be a valuable addition to the fermentation media. It is not possible, of course, because of the crude nature of many of these nitrogenous substances to specify definite proportions of the material to be added. An amount of about 0.1% to 5.0% by weight on a solids basis would cover the useful range of nitrogenous substances to be added to the media in most cases.

In common with most fermentation processes, the process of the present invention is conducted with a liquid medium containing certain inorganic salts such as phosphates. Among elements which may be desirable in small amounts of potassium, calcium, magnesium, sulfur, chlorine, cobalt, zinc, copper, iron, molybdenum, boron and certain other elements in traces. When using crude substances as a source of nitrogen or carbon, such as corn steep liquor, many of these elements are contained therein and need not be added to the medium.

The pH of the fermentation media is generally around 4.5 to 8.0 at the beginning of the fermentation, but as the fermentation continues, the pH tends to rise up to as high as 9.0 at the end of the fermentation. Obviously, it may be necessary to adjust the pH of the fermentation medium at the start of the process if the nature of the ingredients are such that the pH is unfavorable. Also, pH adjustments may be advantageously made during the course of the fermentation.

The preferred temperature of the fermentation process is about 26° C. to 28° C. although temperatures as low as about 20° C. or as high as 37° C. may be used. Maximum yield is generally obtained within 48 to 70 hours of fermentation at optimum conditions but, of course, satisfactory yields may be obtained in a shorter period of time especially if the fermentation is well seeded. Longer periods can be used if desired.

The puromycin that is obtained as the result of the fermentation process just described may be used for some purposes with little or no purification. However, for human therapy it will be necessary to recover the substance from the fermentation liquor and purify it to a suitable degree. This may be accomplished by several methods which are dependent upon the physical and chemical properties of the substance.

The new product in the form of its free base is soluble in water and ethyl acetate to the extent of about 1.5 to 2.0 mg. per ml. It is slightly more soluble in chloroform and methyl ethyl ketone. In ethyl alcohol, it is soluble to about 2.5 to 3.5 mg. per ml. It is approximately equally soluble in acetone and butanol. The new product is much more soluble in butanol saturated with water, being soluble to the extent of about 140 to 150 mg. per ml. It is soluble in an 85% ethanol 15% water solution to the extent of about 35 to 40 mg. per ml., and in 85% acetone 15% water solution to the extent of about 110 to 120 mg. per ml. The product is practically insoluble in benzene, toluene, carbon tetrachloride and ether.

It will be understood that these solubility values are those at room temperatures and that higher or lower temperatures result in different solubilities. Also, solubility measurements are difficult to determine and may vary somewhat with the procedures used in determining them. Accordingly, the above values are intended to serve as a guide for use in determining procedures of purification.

The free base can be extracted from aqueous solutions, either the fermentation liquor or partially purified aqueous solutions by water immiscible solvents such as n-butanol, pentanol, ethyl acetate, ethyl methyl ketone, chloroform or mixtures thereof. The addition of an alcohol or a ketone to chloroform increases the distribution coefficient in favor of the organic solvent. The free base may be extracted with greater facility from aqueous solutions when they are at a lightly alkaline pH.

The active compound may be adsorbed on a number of adsorbents including activated charcoal and magnesium silicate. It is adsorbed less strongly by ion exchange materials, either natural or synthetic; also by alumina, fuller's earth, and the like.

As previously indicated, puromycin forms salts with acids and the formation of these salts may be employed in the concentration or the separation and purification of the product. The free base is precipitated, for example, from aqueous solutions by picric acid or phosphotungstic acid. The hydrochloride salt may be recrystallized out of ethyl alcohol or an aqueous hydrochloride solution. Solutions of the acid salts may be converted to the free base by neutralizing with the common alkalies or amines.

To illustrate a preferred procedure of forming puromycin by fermentation and recovery from its fermentation liquor, the following example is given. It will be understood, of course, that this is merely one of the many procedures that may be employed and that the invention is not to be limited to any particular conditions of the fermentation or isolation procedure. Obviously, these may be varied by those within the skill of the art.

A culture of S. albo-niger as described above was obtained from soil by isolation techniques which have been described in technical literature and which have been employed by others to isolate other molds from soil. After the isolation of the mold, it was grown on test tube agar slants which were made up with tap water, 3% maltose, 1% of a commercial peptone preparation and 1.8% agar with the pH adjusted to 5.6 before sterilization. The slants were prepared and inoculated in the usual manner. They were then incubated at 28° C. for 10–14 days and then transferred to a cold room for storage until used to prepare larger quantities of inoculum.

When ready for use, the agar slants were flooded with a few milliliters of water and the growth detached from the agar surface. About 1–2 ml. of the suspension was aseptically transferred to 100 ml. of a sterile nutrient medium in a 500 ml. flask, and the culture flasks incubated for two days at 27° C. in a reciprocating shaker machine. The contents of two of these flasks were then used to inoculate 4 liters of the same medium in a 9 liter bottle. These bottles were incubated for one day at 27° C. while sterile air was continuously bubbled through the culture medium. The contents of one such bottle was used to inoculate 1500 liters of a medium of the following composition:

| | Per cent |
|---|---|
| Corn steep liquor (by weight as received) | 4 |
| Corn starch | 1 |
| Citric acid | 0.2 |
| NaCl | 0.5 |
| $KH_2PO_4$ | 0.2 |
| $K_2HPO_4$ | 0.1 |
| $(NH_4)_2HPO$ | 0.1 |
| $MgSO_4.7H_2O$ | 0.025 |
| $ZnSO.7H_2O$ | 0.005 |

NaOH to pH 7.

The above medium was sterilized in a tank for 45 min. at 120° C., cooled, and then inoculated with the contents of one of the 9 liter bottles. The medium in the tank was allowed to ferment for about 70 hours at a temperature between 25/28° C. The contents of the tank were mechanically agitated and sterile air was introduced into the medium at the rate of about one volume of air per volume of medium per minute. Sterile lard oil was added as necessary to reduce foaming.

At the end of the fermentation period the mash was adjusted to pH 4.0–4.5 with concentrated hydrochloric acid and 33 kg. of diatomaceous earth filter aid was added. The mash was then filtered and adjusted to a pH of 9.0–9.5 with 40% NaOH solution. This filtrate, 1100 liters, was extracted with 400 liters of n-butanol. The butanol phase was then extracted with 133 liters of distilled water at a pH 1.5–2.0. The acid water extracted was then concentrated to 10 liters and placed in a chill room. On standing the hydrochloride salt of the anti-microbial substance of the present invention was precipitated. The crude hydrochloride was recrystallized by dissolving in 40° C. water at a pH between 2 and 4 to make a 10% solution of the salt. Hydrochloric acid was then added to make the solution 1.0 normal. On standing, the hydrochloric salt of the antibiotic was precipitated with a yield of 130 grams.

To obtain the free base in crystalline form it is convenient to dissolve the hydrochloride salt as obtained above to concentrations up to about 15% by weight in water. The solution is then neutralized to PH 7.0 with a base such as NaOH solution whereupon the antibiotic precipitates as the free base.

Puromycin contains the elements carbon, hydrogen, nitrogen and oxygen. A representative analysis gave the following values; carbon, 56.55%; hydrogen, 6.35%; nitrogen, 20.88%; oxygen, 16.22% (by difference). The free base has a melting point of 175.5–177° C. (uncorrected). The melting point of the acid salt is not sharp but the hydrochloride melts in the range of 174° C.–182° C. depending upon the method employed in determining it. The sulfate melts at about 180° C., the picrate, 140.5° C.–141.5° C.

The solubility characteristics of the free base and some of its salts in various solvents have been set forth above. Qualitatively, the compound gives negative response to the ninhydrin test, Molisch test, Ehrlich indol test, glyoxylic indol test and the purine-murexide test. Aqueous solutions do not rotate the plane of polarized light.

In the ultra-violet region of the spectrum the compound exhibits a maximum adsorption at 275m$\mu$ when dissolved of 0.10 N NaOH at a concentration of 20 gammas per ml. and a minimum adsorption at about 240m$\mu$. The maximum adsorption is about at 267m$\mu$ and the minimum at about 241m$\mu$ when dissolved in 0.10 N HCl.

The compounds also exhibit characteristic adsorption curves in the infra-red region of the spectrum. Fig. 1 is a reproduction of the most characteristic part of the infrared adsorption spectrum of the free base. These curves were obtained by a percent transmittance recording spectrophotometer using a rock salt prism with radiation passing through a sample of the compound mulled in a pure hydrocarbon oil. The most characteristic maximum adsorption occurred at the following wave numbers which are given in reciprocal centimeters: 3309, 3200, 3125, 1645, 1600, 1560, 1512, 1428, 1403, 1345, 1303, 1248, 1230, 1184, 1158, 1107, 1070, 1040, 998, 968, 930, 871, 820, 791, 758.

Figure 2:
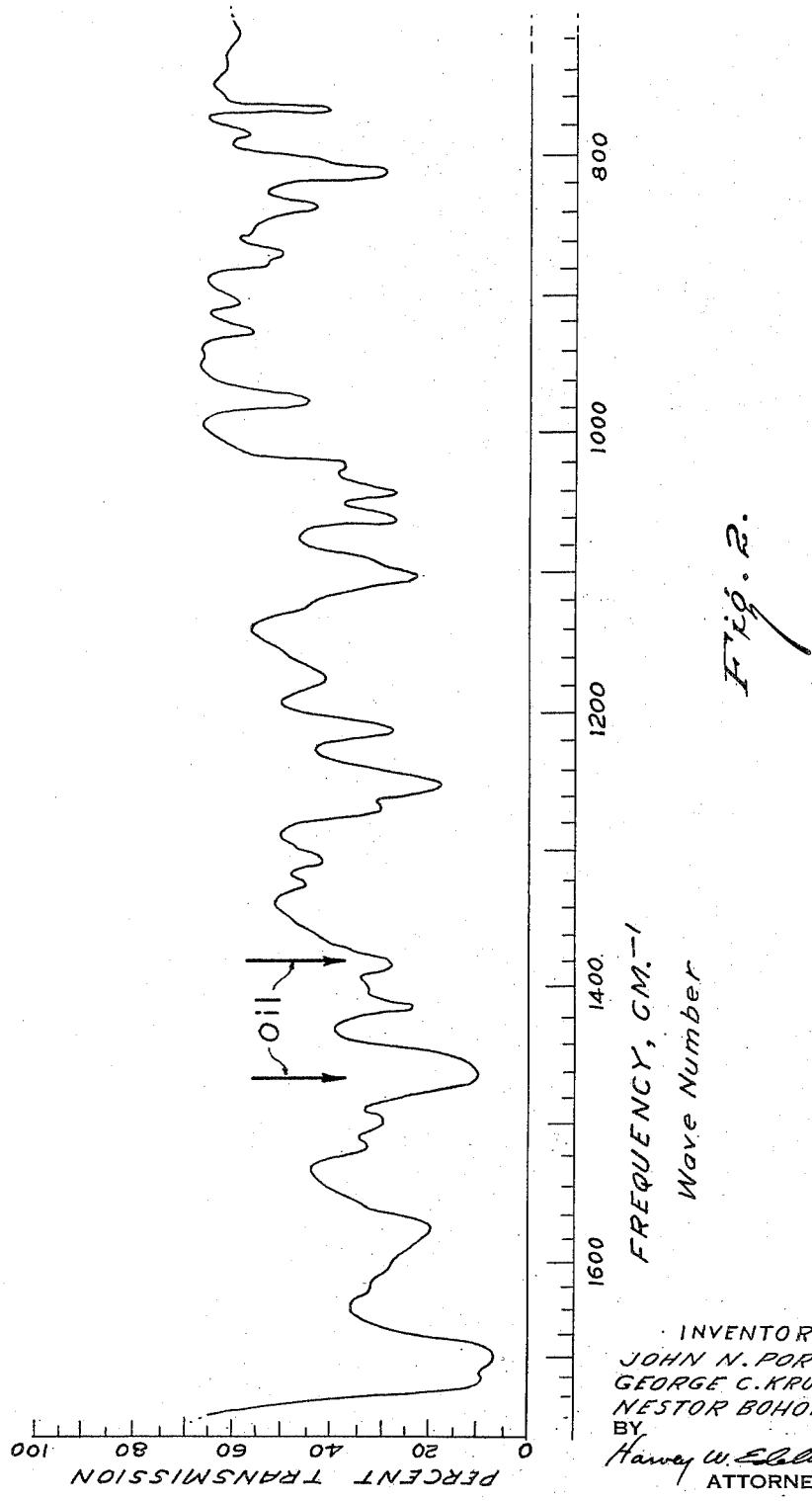

The infra-red adsorption of the hydrochloride salt was obtained in a similar manner. The most characteristic portion of the curve is shown in Figure 2. The principal maximum adsorption occurred at the following wave numbers: 3400, 3212, 3160, 3080, 1662, 1570, 1415, 1308, 1250, 1210, 1168, 1102, 1063, 1045, 1026, 980, 876, 842, 820, 758.

Crystals of the free base are orthorhombic or monoclinic and tend to be bladed in habit when crystallized from 95% ethanol. They show a refractive index of 1.610±0.003 parallel to the direction of elongation and 1.640±0.005 transverse to the direction of elongation but lying in the plane of flattening. The crystals of the hydrochloride salt are also probably monoclinic but may be orthorhombic and tend to be bladed in habit. Their refractive index is 1.522±0.003 parallel to the direction of elongation and 1.629±transverse to the direction of elongation and parallel to the plane of flattening. The hydrochloride crystals are biaxial negative.

X-ray diffraction data were also obtained on powdered samples of the free base and the anhydrous dihydrochloride salt using copper radiation with a nickel filter. The interplanar distances expressed in Angstrom units, and the estimated intensities expressed in an arbitrary scale from 1 to 10 are shown in the following table.

| Free Base | | Dihydrochloride Anhydrous | |
|---|---|---|---|
| dA | I | dA | I |
| 17.8 | 10 | 13.7 | 8 |
| 13.2 | 4 | 9.74 | 6 |
| 7.97 | 1 | 8.61 | ½ |
| 7.26 | ½ | 7.65 | 4 |
| 6.59 | 10 | 6.71 | 10 |
| 5.79 | 5 | 6.00 | 10 |
| 4.95 | 1 | 5.44 | 5 |
| 4.70 | 3 | 5.07 | 6 |
| 4.36 | 7 | 4.88 | 1 |
| 4.21 | 6 | 4.71 | ½ |
| 3.80 | 9 | 4.49 | 5 |
| 3.66 | 8 | 4.22 | 5 |
| 3.49 | 2− | 3.92 | 7 |
| 3.31 | 2− | 3.82 | 7 |
| 3.20 | 3 | 3.69 | 9 |
| 3.10 | 1 | 3.58 | 2 |
| 3.01 | 3 | 3.44 | 5 |
| 2.89 | 2 | 3.34 | 10 |
| | | 3.25 | 1 |
| | | 3.15 | 1+ |
| | | 3.08 | 3 |
| | | 2.99 | 3 |
| | | 2.92 | 1 |
| | | 2.76 | 3 |

What we claim is:
1. A method for the production of puromycin which comprises the steps of propagating the microorganism *Streptomyces albo-niger* under aerobic conditions in a nutrient aqueous solution at a temperature within the range 20° C.–37° C. at a pH of between 4.5 and 9.0 until a substantial amount of puromycin is formed in said solution.

2. A process for producing puromycin which comprises the steps of adding to an aqueous nutrient liquor a culture of *Streptomyces albo-niger* and maintaining the inoculated solution at a temperature within the range 20°–37° C. and the pH between 4.5 and 9.0 while aerating the medium for a period of time between about 48 to 70 hours and thereafter recovering the so-produced puromycin from the aqueous medium.

3. A process of producing a substance effective against Trypanosomes which comprises the steps of propagating the microorganism *S. albo-niger* in an aqueous nutrient medium containing assimilable carbonaceous and nitrogenous substances and mineral salts essential for growth of the organism, said aqueous solution being aerated and maintained during the process at a temperature within the range 20° C.–37° C. and a pH between about 4.5 and 9.0, and after a period of about 48 hours adjusting the aqueous phase to an alkaline pH and extracting with n-butanol, thereafter extracting the butanol phase with a dilute solution of hydrochloric acid and recovering from said aqueous solution a hydrochloride salt which is effective against Trypanosomes.

4. A process in accordance with claim 3 in which the hydrochloride salt is dissolved in water to provide a concentrated solution which is then neutralized whereupon a substance having antimicrobial properties is precipitated as a free base.

5. Compounds selected from the group consisting of those having the structural formula:

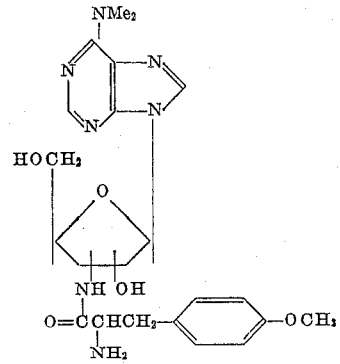

and the acid salts thereof.

6. The compound having the structural formula:

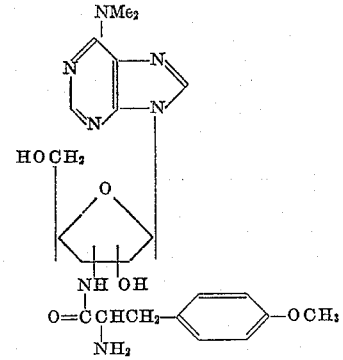

References Cited in the file of this patent
UNITED STATES PATENTS
2,516,080   Sobin et al. _____ July 18, 1950

OTHER REFERENCES
Waksman: "Microbial Antagonisms and Antibiotic Substances" Published 1945 by The Commonwealth Fund, New York City, page 147.

Waksman: "Antibiotics of Actinomycetes," January 1947, paper presented at the Conference on Antibiotic Research held at Washington, D. C., on January 31 and February 1, 1947 under the auspices of the Antibiotic Study Section of the N. I. H., page 9.

Florey et al.: Antibiotics, volume 1, 1949, Oxford Univ. Press, page 406.

Baron: Handbook of Antibiotics, 1950, Reinhold Publishing Corporation, New York, pages 39, 202 to 203.

Waksman: "The Actinomycetes," published 1950, pages 116 to 119.

Waller et al.: article in J. A. C. S., April 20, 1953, page 2025.

Hewitt et al.: "Antibiotics and Chemotherapy," December 1954 (page 1222 relied on).

Hewitt et al.: "Antibiotics and Chemotherapy," March 1955 (page 139 relied on).